(12) United States Patent
Kim

(10) Patent No.: US 9,711,993 B2
(45) Date of Patent: Jul. 18, 2017

(54) OPPORTUNISTIC CHARGING OF AN ELECTRONIC DEVICE

(71) Applicant: HARMAN INTERNATIONAL INDUSTRIES, INC., Stamford, CT (US)

(72) Inventor: Seonman Kim, Palo Alto, CA (US)

(73) Assignee: HARMAN INTERNATIONAL INDUSTRIES, INC., Stamford, CT (US)

( * ) Notice: Subject to any disclaimer, the term of this patent is extended or adjusted under 35 U.S.C. 154(b) by 145 days.

(21) Appl. No.: 14/552,221

(22) Filed: Nov. 24, 2014

(65) Prior Publication Data

US 2016/0149434 A1 May 26, 2016

(51) Int. Cl.
*H02J 7/00* (2006.01)
*H02J 7/02* (2016.01)
*H02J 5/00* (2016.01)
*H02J 50/10* (2016.01)
*H02J 50/40* (2016.01)
*H02J 50/90* (2016.01)

(52) U.S. Cl.
CPC .............. *H02J 7/025* (2013.01); *H02J 5/005* (2013.01); *H02J 50/10* (2016.02); *H02J 50/40* (2016.02); *H02J 50/90* (2016.02); *B60K 2350/928* (2013.01)

(58) Field of Classification Search
CPC ........ H02J 7/025; H01F 38/14; Y02T 90/122; B60L 11/182; Y02E 60/12
USPC ........................................ 320/108
See application file for complete search history.

(56) References Cited

U.S. PATENT DOCUMENTS

| | | | |
|---|---|---|---|
| 2004/0145342 A1* | 7/2004 | Lyon ................. | H02J 7/025 320/108 |
| 2004/0267422 A1* | 12/2004 | Bossler ............... | B62D 1/06 701/41 |
| 2005/0140482 A1 | 6/2005 | Cheng et al. | |
| 2008/0174451 A1* | 7/2008 | Harrington ........... | G08B 21/06 340/905 |
| 2009/0082835 A1* | 3/2009 | Jaax .................. | A61N 1/08 607/61 |
| 2009/0321483 A1* | 12/2009 | Froloff ............... | A45F 5/00 224/267 |
| 2010/0167691 A1* | 7/2010 | Howarter ........... | H04M 1/72577 455/410 |
| 2010/0259217 A1 | 10/2010 | Baarman et al. | |

FOREIGN PATENT DOCUMENTS

| | | |
|---|---|---|
| WO | 2008050260 A1 | 5/2008 |
| WO | 2008137996 A1 | 11/2008 |
| WO | 2014152004 A1 | 9/2014 |

OTHER PUBLICATIONS

Extended European Search Report Application No. 15 19 5274, dated Mar. 17, 2016, 10 pages.

* cited by examiner

*Primary Examiner* — Arun Williams
(74) *Attorney, Agent, or Firm* — Artegis Law Group, LLP

(57) ABSTRACT

One embodiment of the present invention sets forth a technique for charging an electronic device. The technique includes determining that the electronic device is proximate to a first induction coil that is included in a plurality of induction coils that are disposed in a steering wheel. The technique further includes, in response to determining that the electronic device is proximate to the first induction coil, causing electrical current to be supplied to the first induction coil to charge the electronic device.

20 Claims, 7 Drawing Sheets

OPPORTUNISTIC CHARGING OF AN ELECTRONIC DEVICE

BACKGROUND

Field of the Embodiments

Embodiments of the present invention generally relate to electrical power and, more specifically, to opportunistic charging of an electronic device.

Description of the Related Art

Use of electronic devices, such as smartphones, activity trackers, smart watches, wireless headphones, etc., is becoming increasingly popular in all aspects of daily life. Such devices enable users to communicate with friends and family, enjoy various types of entertainment media, and track different aspects of their productivity.

In recent years, the sizes of components included in electronic devices (e.g., processors and memory chips) have been significantly reduced. As a result, electronic device manufacturers commonly seek to distinguish their products from competitors' products by providing small form factors that retain high-performance characteristics. However, as device size is reduced, the size of the battery included in the device is typically reduced as well, decreasing the total amount of energy that can be stored. Additionally, although processor and memory sizes and efficiencies have steadily improved over recent years, battery performance (e.g., energy storage capacity) has not changed significantly. Consequently, many electronic devices require frequent recharging, typically once a day or more.

Accordingly, techniques that enable a user to more effectively charge an electronic device would be useful.

SUMMARY

One embodiment sets forth a method for charging an electronic device. The method includes determining that the electronic device is proximate to a first induction coil that is included in a plurality of induction coils that are disposed in a steering wheel. The method further includes, in response to determining that the electronic device is proximate to the first induction coil, causing electrical current to be supplied to the first induction coil to charge the electronic device.

Further embodiments provide, among other things, a system and a non-transitory computer-readable medium configured to carry out method steps set forth above.

At least one advantage of the disclosed techniques is that they enable a user to opportunistically charge an electronic device while performing everyday activities, such as driving an automobile. Thus, the electronic device may be charged based on the user's normal actions, without requiring the user to carry a charger or locate a wall socket to charge his or her device. Accordingly, an electronic device may be conveniently charged without imposing a significant burden on the user.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments. However, it will be apparent to one of skill in the art that the embodiments may be practiced without one or more of these specific details.

Figure 1:
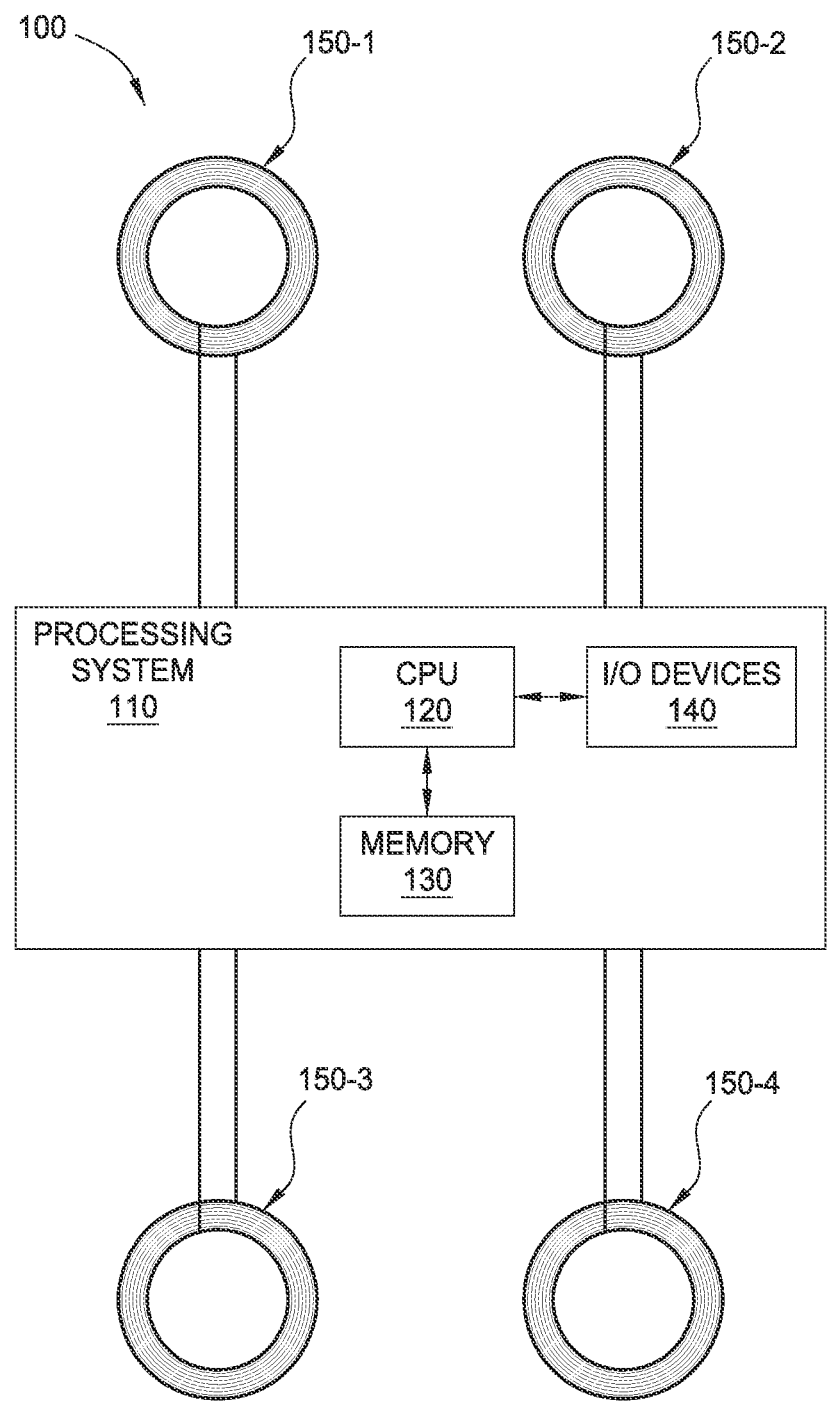
FIG. 1 illustrates a charging system for charging an electronic device, according to various embodiments.

FIG. 1 illustrates a charging system 100 for charging an electronic device, according to various embodiments. The charging system 100 may include, without limitation, a processing system 110 and one or more induction coils 150 (e.g., induction coil 150-1, induction coil 150-2, induction coil 150-3, and induction coil 150-4). The processing system 110 may include a central processing unit (CPU) 120, a memory 130, and one or more input/output (I/O) devices 140. Although the CPU 120, memory 130, and I/O device(s) 140 are shown as separate modules in FIG. 1, in some embodiments, one or more of these components may be included in a single integrated circuit (e.g., a system-on-chip).

The I/O device(s) 140 may include one or more types of wired receiver(s) and/or wireless receiver(s). The wired receiver(s) and/or wireless receiver(s) may be configured to receive signals from another processing system and/or from an electronic device that is to be charged by the charging system 100. For example, and without limitation, in some embodiments, the wired receiver(s) and/or wireless receiver(s) may receive signals that indicate which induction coil(s) 150 should be driven to charge the electronic device. Additionally, in some embodiments, the charging system 100 may receive software updates (e.g., firmware) via the wired receiver(s) and/or wireless receiver(s). The software updates may include one or more charging algorithms and/or charging specifications, such as preferred voltages, currents, frequencies, thresholds, etc. The software updates may then be stored in the memory 130. In the same or other embodiments, the I/O device(s) 140 may include a near-field communication (NFC) controller. The NFC controller may communicate with an electronic device that is to be charged by the charging system 100, such as to determine the location of the electronic device relative to the charging coil(s) 150, to determine a battery level of the electronic device, and/or to receive other charging-related information from the electronic device. Such information may be stored in the memory 130.

The I/O device(s) 140 may further include a touch sensing controller that determines whether a user is touching and/or in close proximity to an object in which one or more induction coils 150 are disposed. For example, and without limitation, the touch sensing controller may be used to detect changes in capacitance, resistance, inductance, temperature, etc. of one or more touch sensors (e.g., touch sensor electrodes) disposed in or near an object in order to determine whether an electronic device possessed by the user can be charged by the charging system 100. In one specific example, capacitance and/or temperature sensors may be disposed in a steering wheel in order to detect whether a user is holding the steering wheel and/or the location(s) at which the user is holding the steering wheel. If the touch sensing controller determines that the user is holding the steering wheel, then one or more induction coils 150 may be activated to charge an electronic device possessed by the user. Additionally, the touch sensing controller may determine which induction coil(s) 150 should be activated based on the location(s) at which the user is holding the steering wheel. Similar techniques may be used to determine whether and/or where a user is touching (or in close proximity to) other objects included in the same or other types of environments.

The induction coil(s) 150 may include a conductive material, such as copper wire, that is covered by an insulator and wound into a coil-like shape. Although circular induction coils 150 are shown in FIG. 1, any shape (e.g., rectangular, triangular, oval, freeform, etc.) or material may be used. For example, and without limitation, in some embodiments, the shape of the induction coils 150 may be non-circular and specifically designed to fit within an object having a non-circular shape or cross-section. In addition, although four induction coils 150 are shown in FIG. 1, in other embodiments, more induction coils 150 (e.g., 6, 8, 12, or more induction coils 150) or less induction coils 150 (e.g., 2 or 3 induction coils 150) may be used.

As also shown, the processing system 110 is coupled to each of the induction coils 150. During operation of the charging system 100, the processing system 110 is configured to drive electrical current through one or more of the induction coils 150 in order to charge one or more electronic devices. In other embodiments, one or more induction coils 150 may be coupled to separate processing systems 110. For example, and without limitation, the charging system 100 may include more than one processing system 110, each of which is coupled to one or more induction coils 150. Such embodiments of the charging system 100 may be useful when two or more induction coils 150 are positioned at a relatively large distance from one another. Additionally, in such embodiments, the separate processing systems 110 may communicate via a wired connection or wireless connection established using the I/O device(s) 140 included in each processing system 110.

In various embodiments, the charging system 100 may be disposed in one or more objects that a user comes into contact with (or close proximity to) during his/her everyday activities. For example, and without limitation, the charging system 100 may be disposed in objects included in an automotive environment (e.g., steering wheel, transmission shifting assembly, armrest, headrest, console, side panels), an office environment (e.g., desk, keyboard, armrest), a home environment (e.g., table, chair, couch, countertop, bed), and the like. Examples of several such objects, and the manner in which induction coils 150 may be disposed in those objects, are described in further detail below. One should note that the examples described below in no way limit the scope of the present invention.

Figure 2:
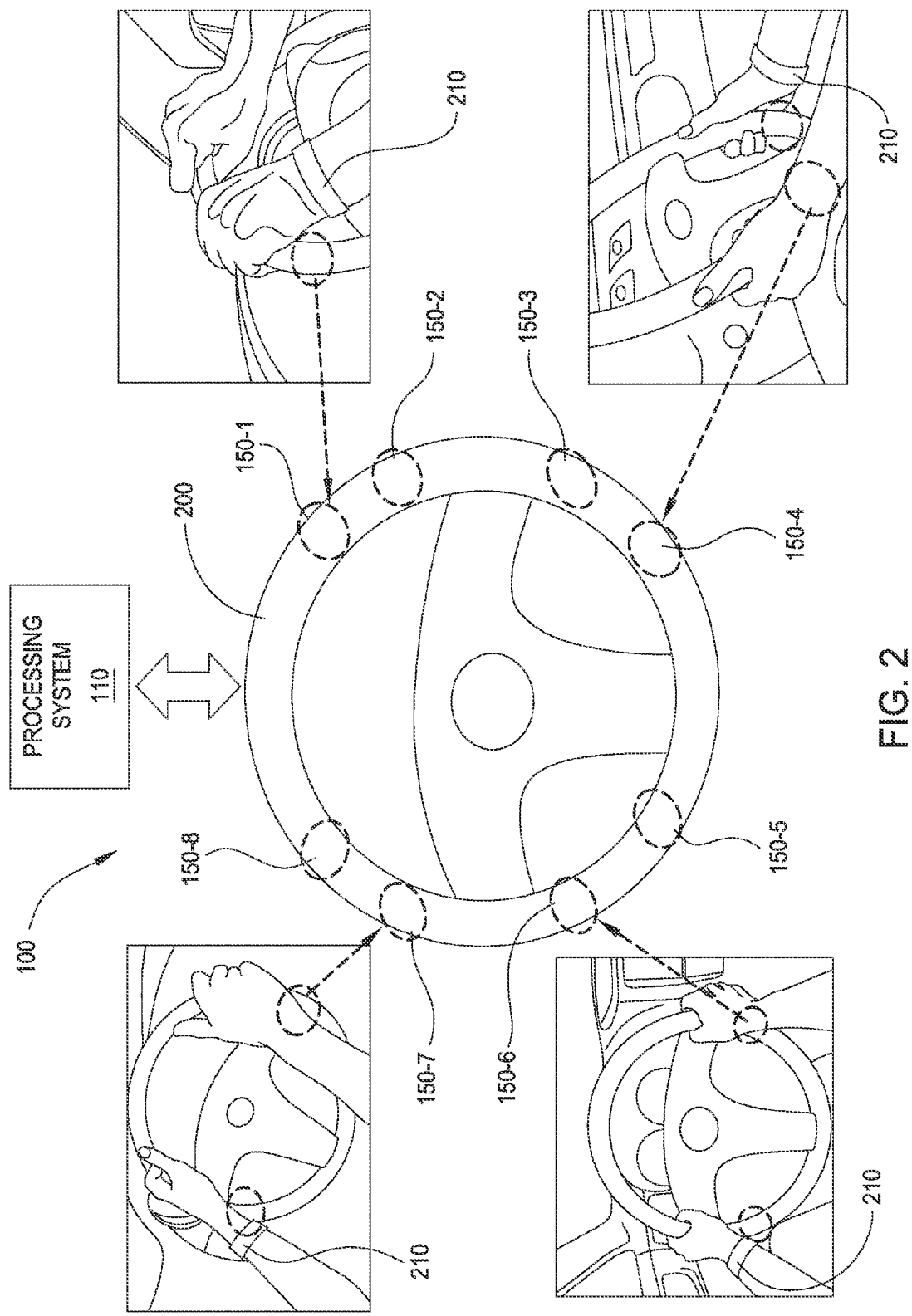
FIG. 2 illustrates the charging system of FIG. 1 implemented in a steering wheel, according to various embodiments.

FIG. 2 illustrates the charging system 100 of FIG. 1 implemented in a steering wheel 200, according to various embodiments. In the embodiment of FIG. 2, eight induction coils 150 are disposed in the steering wheel 200 at locations that correspond to common positions of a driver's hands. Although the embodiments described below include eight induction coils 150, a greater or lesser number of induction coils 150 may be disposed in the steering wheel 200. For example, and without limitations, in some embodiments, inductive coils 150 are disposed in only one or more specific areas of the steering wheel 200. The user can then charge an electronic device by positioning the electronic device proximate to those areas of the steering wheel 200. In other embodiments, inductive coils 150 are disposed in multiple locations that cover substantially the entire circumference of the steering wheel 200, enabling the user to charge the electronic device at various locations on the steering wheel 200.

During operation, a user grasps one or more locations on the steering wheel 200. The processing system 110 then determines whether any of the user's electronic devices (e.g., a wearable device 210, such as a wrist-worn device) are proximate to one or more induction coils 150 disposed in the steering wheel 200. If the processing system 110 determines that an electronic device is proximate to an induction coil 150, then the processing system 110 may supply electrical current to that induction coil 150 in order to charge the electronic device. The processing system 110 may determine whether the electronic device is close enough to an induction coil 150 to receive electromagnetic energy from the induction coil 150 by any technical means. However, several exemplary techniques for determining whether to charge an electronic device using a particular induction coil 150 are described below.

In some embodiments, the processing system 110 determines whether to charge an electronic device via a particular induction coil 150 based on changes to the electrical characteristics (e.g., changes in inductance, capacitance, resistance, etc.) of the induction coil 150 itself. For example, and without limitation, a sensing signal may be periodically transmitted to each induction coil 150 to determine whether an electronic device capable of being inductively charged is proximate to the induction coil 150. Then, if a capable electronic device is detected, the processing system 110 may supply electrical current to the induction coil 150.

In the same or other embodiments, the processing system 110 is configured to determine whether to charge an electronic device via a particular induction coil 150 by wirelessly communicating with the electronic device, such as via NFC. For example, and without limitation, the processing system 110 itself may include an NFC module that communicates with the electronic device and/or one or more of the induction coils 150 may include NFC modules that detect when an electronic device is proximate to the induction coil 150. In some embodiments, the processing system 110 is in communication with one or more wireless sensors that are placed in the user's environment to track the location of an electronic device and determine whether the electronic device is within a threshold distance (e.g., 6 inches or less) from an induction coil 150. For example, and without limitation, in an automotive environment, one or more wireless sensors may be located in a dashboard, side panels, a center console, doors, pillars, etc. to track the location of an electronic device (e.g., via a signal strength of the electronic device) and determine whether the electronic device is within a threshold distance from an induction coil 150. In some embodiments, the one or more wireless sensors may determine whether the strength of a wireless signal received from the electronic device is above a threshold value. In the same or other embodiments, three or more wireless sensors may be disposed within an environment (e.g., an automotive environment) in order to triangulate the location of the electronic device.

Additionally, charging information may be transmitted from the electronic device to the processing system 110 via NFC or any other wireless protocol. The charging information transmitted to the processing system 110 may inform the processing system 110 of the specific charging specifications needed to safely charge the electronic device. For example, and without limitation, the charging specification may indicate the characteristics of the electrical current (e.g., voltage, amperage, frequency, thresholds) that should be supplied to an electronic device.

In some embodiments, the processing system 110 determines whether to charge an electronic device via a particular induction coil 150 based on touch sensing and/or proximity sensing data received from a touch sensing controller included in the processing system 110. For example, and without limitation, the touch sensing controller may collect data (e.g., changes in capacitance, resistance, inductance, temperature, pressure, etc.) from one or more sensors disposed in the steering wheel 200. Then, based on the location at which touch sensing and/or proximity sensing data is received, the processing system 110 may infer which induction coil(s) 150 are proximate to the electronic device, if any. The processing system 110 may then supply electrical current to those induction coil(s) 150 in order to charge the electronic device. For example, and without limitation, as shown in FIG. 2, when the processing system 110 determines that the user is holding the steering wheel 200 at a location that is just above the location of induction coil 150-7, then the processing system 110 may supply electrical current to induction coil 150-7 in order to charge the wearable device 210 attached to the user's wrist. Similarly, when the processing system 110 determines that the user is holding the steering wheel 200 at a location that is just above the location of induction coil 150-4, then the processing system 110 may supply electrical current to induction coil 150-4 in order to charge the wearable device 210 attached to the user's wrist.

Additionally, which induction coil 150 is supplied electrical current by the processing system 110 in response to touch sensing and/or proximity sensing may depend upon the type of electronic device and/or the type of induction coil that is disposed in the electronic device. For example, and without limitation, if the electronic device is a wrist-worn device, then the processing system 110 may supply electrical current to one or more induction coil(s) 150 that are located a certain distance 1 to 6 inches) below the position(s) at which the user's hand(s) are detected. However, if the electronic device is a hand-worn device (e.g., an electronic ring), then the processing system 110 may supply electrical current to one or more induction coil(s) 150 that are located substantially at or near the position(s) at which the user's hand(s) are detected. Further, different types of induction coils that may be disposed in electronic devices (e.g., for receiving energy from the charging system 100) are described below in conjunction with FIGS. 3A and 3B.

In various embodiments, some or all of the techniques for determining whether to supply electrical current to a particular induction coil 150 may be combined. Accordingly, combining two or more of the techniques described above may increase the accuracy with which the processing system 110 determines which induction coil(s) 150 should be supplied with electrical current to charge an electronic device.

The processing system 110 may be disposed in the steering wheel 200 and/or the processing system 110 may be disposed in a remote location, such as in a car head unit. In addition, different components of the processing system 110 may be disposed in the steering wheel 200 and/or outside of the steering wheel 200. Further, as described above, multiple processing systems 110 may be included in the charging system 100, one or more of which may be located remotely from the induction coils 150.

Figure 3A:
FIGS. 3A and 3B illustrate two different configurations of a wearable device that may be charged via the charging system of FIG. 1, according to various embodiments.
Figure 3B:
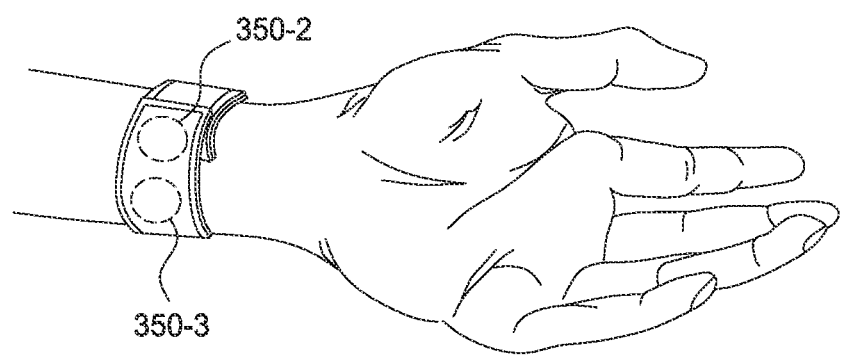

FIGS. 3A and 3B illustrate two configurations of a wearable device 210 that may be charged via the charging system 100 of FIG. 1, according to various embodiments. In some embodiments, the wearable device 210 may include, and without limitation, a watch, an activity tracker, a media player, a communication device, a device controller, and the like. Because the wearable device 210 is attached to the user (e.g., on the user's wrist), charging the wearable device 210 may be cumbersome, requiring the user to remove the wearable device 210 and place the wearable device 210 on a dedicated charger. However, by charging the wearable device 210 while the device remains in the possession of the user, the battery may be recharged without requiring frequent removal of the wearable device 210.

Various types and shapes of induction coils 350 may be included in an electronic device that is to be charged by the charging system 100. For example, and without limitation, as shown in FIG. 3A, induction coil 350-1 may extend along the length and/or around the circumference of the electronic device. In such embodiments, the size and/or cross-section of the induction coil 350 may be increased, thereby enabling the electronic device to be charged via a wider range of angles relative to the induction coils 150 included in the charging system 100. Additionally, increasing the size and/or cross-section of the induction coil 350 may enable the electronic device to be charged at a greater distance from the induction coils 150 included in the charging system 100.

In the same or other embodiments, one or more induction coils 350-2, 350-3 may be disposed at different locations in the electronic device to enable the electronic device to be charged in a greater number of orientations. For example, and without limitation, disposing an induction coil 350 on a front side of the electronic device and disposing another induction coil 350 on a rear side of the electronic device may enable the charging system 100 to charge the device both when the electronic device is facing towards and facing away from an induction coil 150 included in the charging system 100. Additionally, to further improve the flexibility of charging the electronic device, one or more additional induction coils 350 may be disposed in the sides of the electronic device. Although only one induction coil 350 and two induction coils 350 are shown in FIGS. 3A and 3B, respectively, in other embodiments, a greater or lesser number of induction coils 350 may be used.

Although the induction coils 350 shown in FIGS. 3A and 3B have been described as being disposed in a wearable device 210, similar induction coil 350 configurations may be used in other types of electronic devices. For example, and without limitation, similar induction coil 350 configurations may be used in smartphones, portable computers, wireless headphones, medical devices, and the like.

Figure 4A:
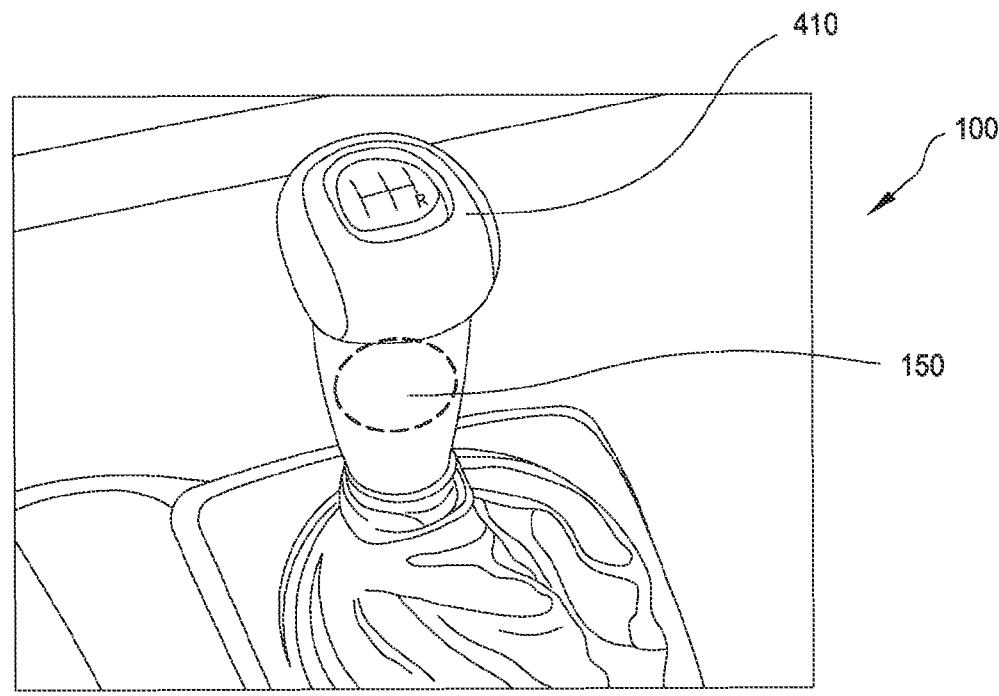
FIGS. 4A-4E illustrate the charging system of FIG. 1 implemented in various types of objects, according to various embodiments.

FIGS. 4A-4E illustrate the charging system 100 of FIG. 1 implemented in various types of objects, according to various embodiments. As described above, in general, induction coils 150 may be disposed in any object that a user comes into contact with (or close proximity to) during everyday activities, such as when the user is driving, working, cooking, sleeping, exercising, watching television, grooming, etc. For example, and without limitation, as shown in FIG. 4A, one or more induction coils 150 may be disposed in a transmission shifting assembly 410. Then, while a user is operating his/her automobile, the charging system 100 may supply current to the induction coil(s) 150 disposed in the transmission shifting assembly 410 to charge the user's electronic device, such as a wearable device 210 that is attached to the user's wrist. In the same or other embodiments, one or more induction coils 150 may be disposed in other objects within an automobile interior, such as in a side panel, a pillar, a console, and/or a door.

Figure 4B:
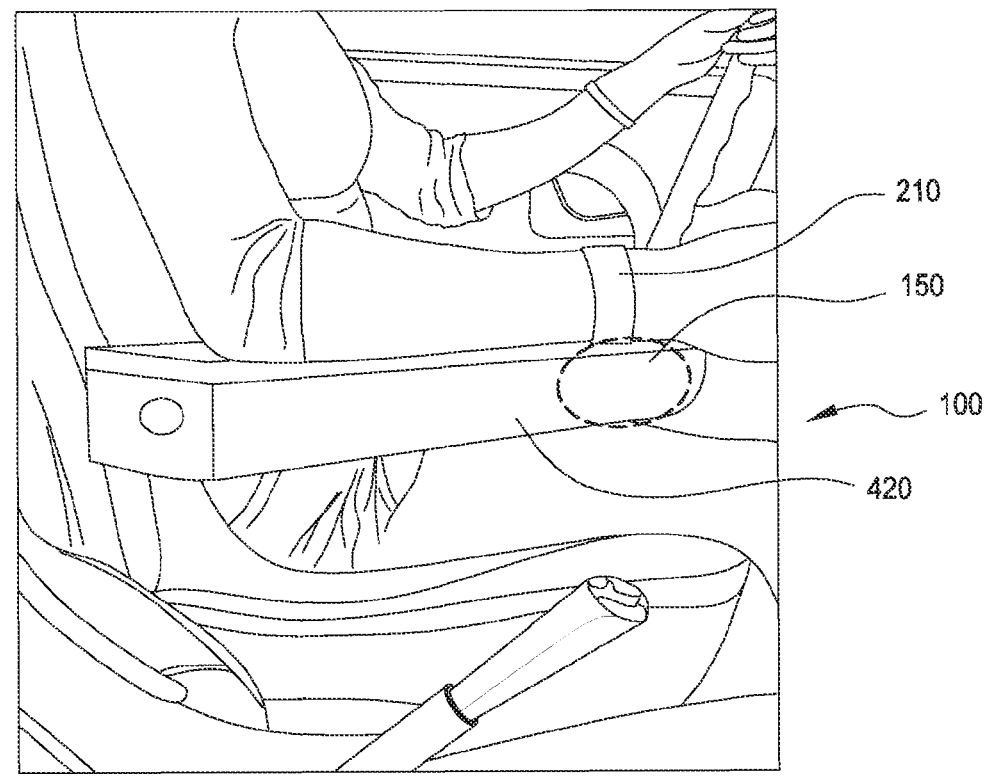

Additionally, as shown in FIG. 4B, one or more induction coils 150 may be disposed in an armrest 420, such as an armrest of an automobile seat, a desk chair, a couch, and the like. The user's electronic device, such as a wearable device 210 on the user's wrist and/or a smartphone in the user's pocket, may then be charged by the induction coil(s) 150 while the user is seated. In the same or other embodiments, one or more induction coils 150 may be disposed in the seat cushion, seat frame, and/or seat headrest.

Figure 4C:
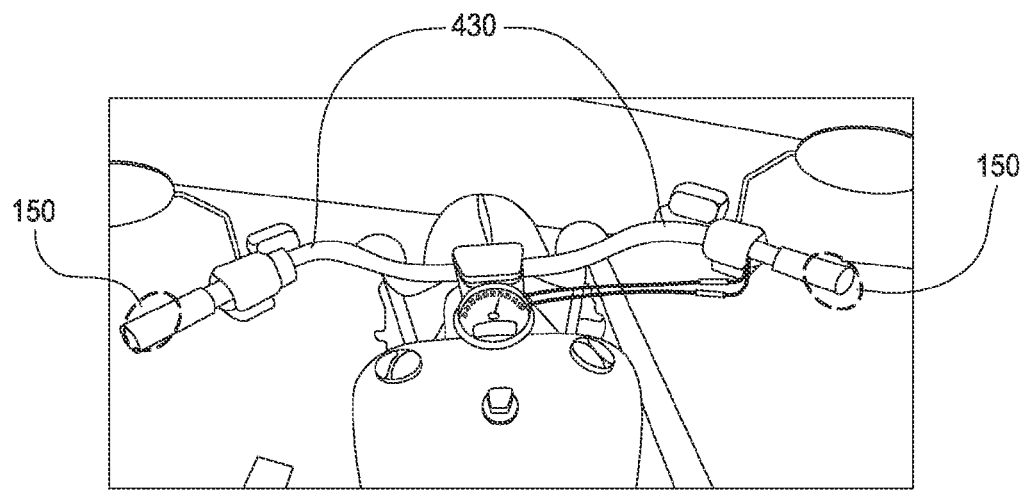
Figure 4D:
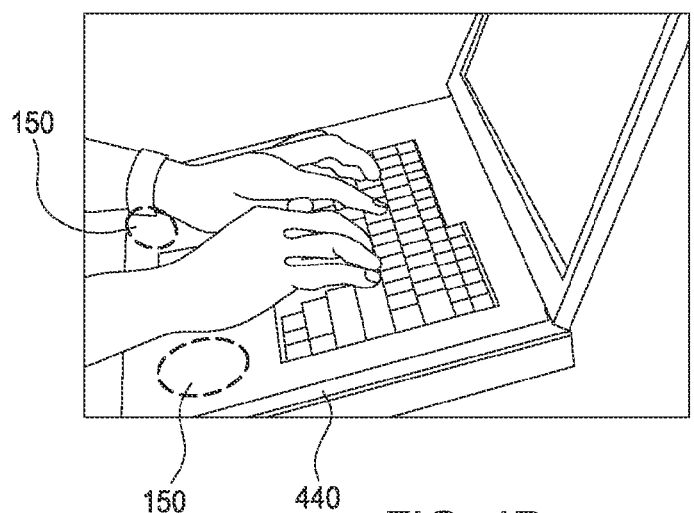

As shown in FIG. 4C, one or more induction coils 150 may be disposed in other types of vehicles, such as in the handlebars 430 of a motorcycle, bicycle, scooter, etc. The user's electronic device may then be charged by the induction coil(s) 150 while the user is operating the vehicle.

Figure 4E:
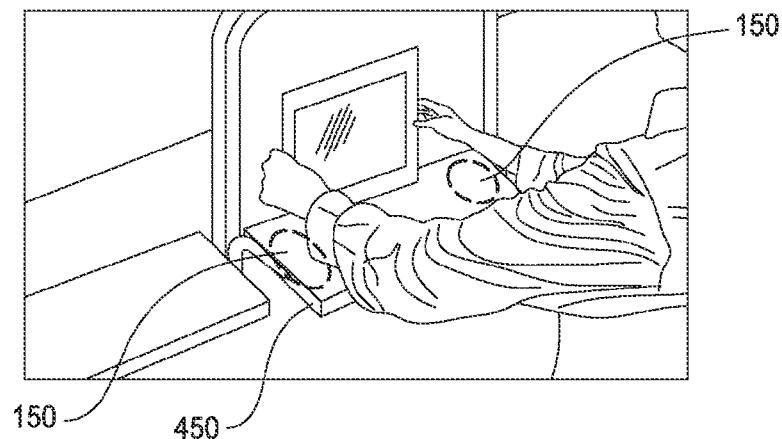

In some embodiments, one or more induction coils 150 may be disposed in surfaces on which a user commonly places his or her limbs. For example, and without limitation, in FIG. 4D, two induction coils 150 are disposed in an area of a laptop computer 440 on which a user frequently rests his or her wrists. Additionally, one or more induction coils 150 may be disposed in a desk, in front of a region on which a keyboard device (e.g., a laptop 440 or dedicated keyboard) is commonly positioned. In such configurations, when a user positions a wearable device 210 in the region in front of the keyboard (e.g., while typing), the wearable device 210 may be charged by the charging system 100. Similarly, as shown in FIG. 4E, two induction coils 150 are disposed in an area of a tray table 450 where a user may place his arms.

Figure 5:
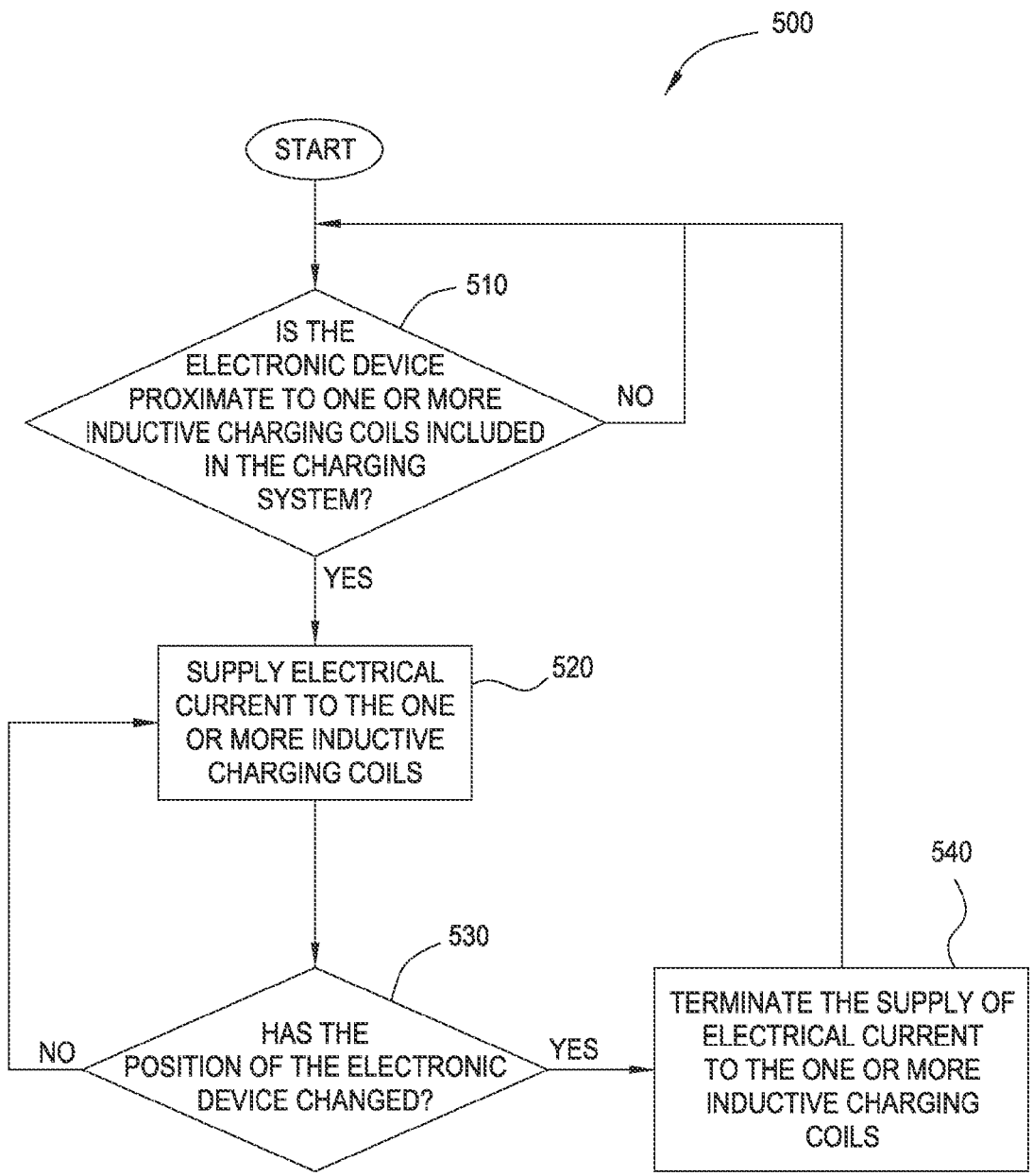
FIG. 5 is a flow diagram of method steps for charging an electronic device, according to various embodiments.

FIG. 5 is a flow diagram of method steps for charging an electronic device, according to various embodiments. Although the method steps are described in conjunction with the systems of FIGS. 1-4E, persons skilled in the art will understand that any system configured to perform the method steps, in any order, falls within the scope of the present invention.

As shown, a method 500 begins at step 510, where the processing system 110 determines whether an electronic device is proximate to one or more induction coils 150 included in the charging system 100. For example, and without limitation, the processing system 110 may determine whether the electronic device is proximate to the induction coil(s) 150 based on any of the techniques described above. Further, in some embodiments, at step 510, the processing system 110 may determine whether the electronic device is within a threshold distance (e.g., 6 inches) from the induction coil(s) 150. If an electronic device is not proximate to one or more induction coils 150, then the processing system 110 continues monitoring for an electronic device. If an electronic device is proximate to one or more induction coils 150, then, at step 520, the processing system 110 supplies electrical current to the one or more induction coils 150.

Next, at step 530, the processing system 110 determines whether the position of the electronic device has changed relative to the induction coil(s) 150. For example, and without limitation, the processing system 110 may determine whether the position of the electronic device has changed using the same or similar techniques to those that are used at step 510 to initially detect whether the electronic device is proximate to the induction coil(s) 150. In some embodiments, at step 530, the processing system 110 determines whether the electronic device is greater than the threshold distance from the induction coil(s) 150. Such a determination may be based on detecting changes to the electrical characteristics of the induction coil(s) 150 with the processing system 110, as described above, and/or based on any of the other sensing techniques described above.

If the position of the electronic device relative to the induction coil(s) 150 has not changed, then the processing system 110 continues to supply electrical current to the induction coil(s) 150. If the position of the electronic device relative to the induction coil(s) 150 has changed, then, at step 540, the processing system terminates the supply of electrical current to the induction coil(s) 150. The method 500 then returns to step 510.

Figure 6:
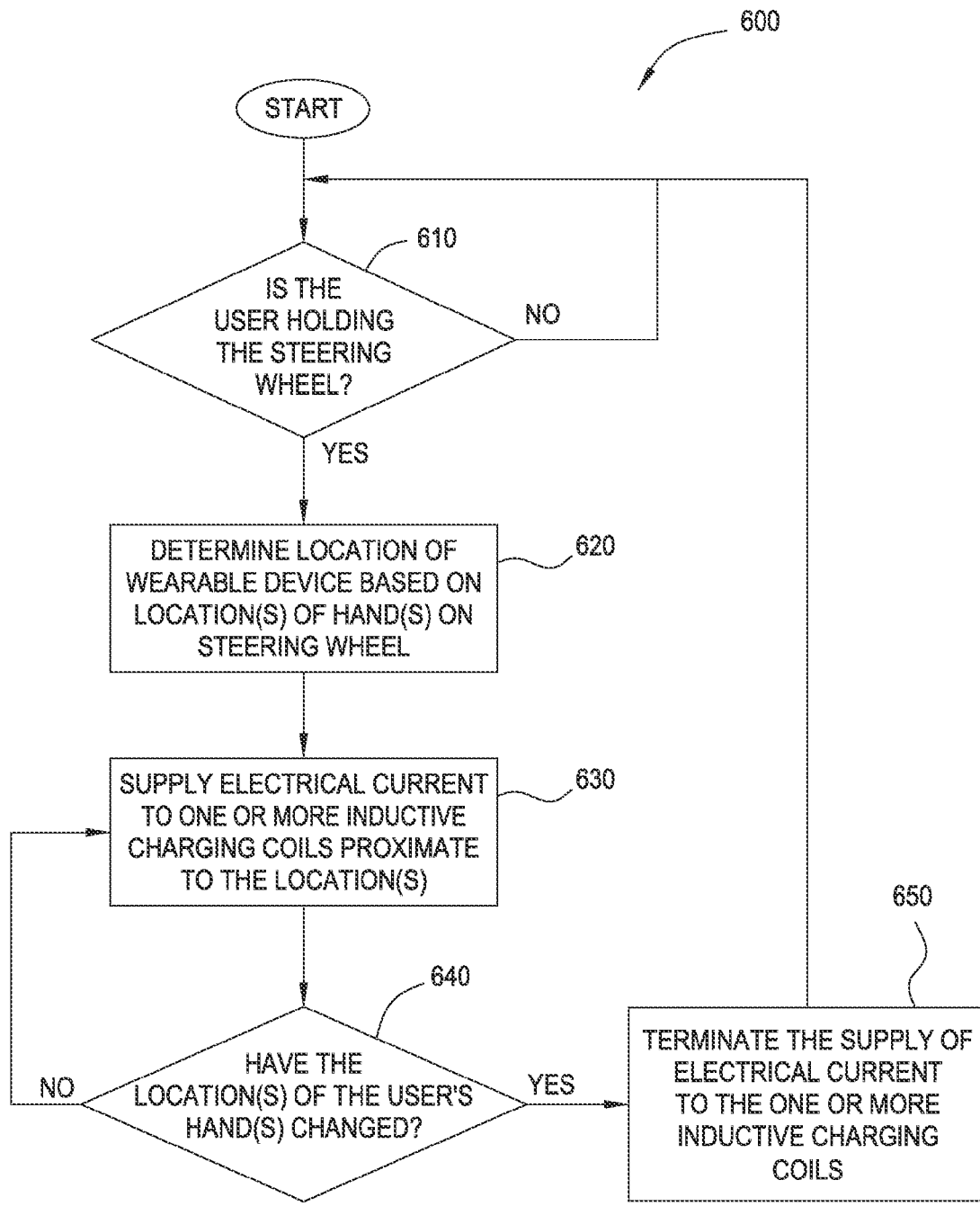
FIG. 6 is a flow diagram of method steps for charging an electronic device that is proximate to a steering wheel, according to various embodiments.

FIG. 6 is a flow diagram of method steps for charging an electronic device that is positioned proximate to a steering wheel 200, according to various embodiments. Although the method steps are described in conjunction with the systems of FIGS. 1-3B, persons skilled in the art will understand that any system configured to perform the method steps, in any order, falls within the scope of the present invention.

As shown, a method 600 begins at step 610, where the processing system 110 determines whether the user is holding the steering wheel 200. As described above, the processing system 110 may determine whether the user is holding the steering wheel 200 using a touch sensing controller included in the processing system 110 and/or included in a separate processing system. If the user is not holding the steering wheel 200, then the processing system 110 continues to monitor the steering wheel 200 for user interaction. If the user is holding the steering wheel 200, then, at step 620, the processing system 110 determines the location of an electronic device associated with the user, such as a wearable device 210 that is being worn by the user. As described above, in some embodiments, the location of electronic device may be inferred based on the location(s) at which the user is holding the steering wheel 200. In the same or other embodiments, at step 620, once the processing system 110 determines that the user is holding the steering wheel 200, the processing system 110 determines whether an electronic device is proximate to any of the induction coils 150. Then, at step 630, the processing system 110 supplies electrical current to one or more induction coils 150 that are proximate to the location(s) of the user's hands.

Next, at step 640, the processing system 110 determines whether the location(s) of the user's hands (e.g., on the steering wheel 200) have changed. In some embodiments, the processing system 110 determines whether the location(s) of the user's hand(s) have changed based only on data received from the touch sensing controller. However, in other embodiments, the processing system 110 determines whether the location(s) of the user's hand(s) have changed based data received from the touch sensing controller and/or based on data acquired via other sensing techniques, such as the sensing techniques used in steps 510 and 530 of the method 500 of FIG. 5. If the location(s) of the user's hands have not changed, then the processing system 110 continues to supply electrical current to the induction coil(s) 150. If the location(s) of the user's hands have changed, then, at step 650, the processing system 110 terminates the supply of electrical current to the induction coil(s) 150. The method 600 then returns to step 610.

In sum, a processing system 110 determines whether an electronic device is positioned proximate to an induction coil 150 included in the charging system. If the electronic device is dose enough to one or more induction coils 150 to transmit electromagnetic energy to the electronic device, then the processing system 110 may supply electrical current to the induction coil(s) 150. The processing system 110 may further determine whether the position of the electronic device has changed. If the position of the electronic device has changed, then the processing system 110 may terminate the supply of electrical current to the induction coil(s) 150 and supply electrical current to one or more different induction coils 150 that are proximate to the new position of the electronic device.

At least one advantage of the disclosed techniques is that they enable a user to opportunistically charge an electronic device while performing everyday activities, such as driving an automobile. Thus, the electronic device may be charged based on the user's normal actions, without requiring the user to carry a charger or locate a wall socket to charge his or her device. Accordingly, an electronic device may be conveniently charged without imposing a significant burden on the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of electronic devices and specific objects in which induction coils may be disposed, persons skilled in the art will appreciate that the systems and techniques described herein are applicable to other types of electronic devices and objects within a user's environment. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for charging an electronic device, comprising:
   transmitting a sensing signal, via a processor, to a first induction coil that is included in a plurality of induction coils that are disposed in a steering wheel to determine that the electronic device is proximate to the first induction coil; and
   in response, causing electrical current to be supplied to the first induction coil to charge the electronic device.

2. The method of claim 1, wherein the plurality of induction coils includes at least four induction coils.

3. The method of claim 1, wherein determining that the electronic device is proximate to the first induction coil comprises determining that the electronic device is within a threshold distance from the first induction coil.

4. The method of claim 1, wherein determining that the electronic device is proximate to the first induction coil comprises detecting a change in an inductance of the first induction coil.

5. The method of claim 1, further comprising:
receiving a charging specification from the electronic device; and
storing the charging specification in a memory,
wherein causing the electrical current to be supplied to the first induction coil comprises determining at least one characteristic of the electrical current based on the charging specification.

6. The method of claim 1, wherein the electronic device comprises a wrist-worn device.

7. The method of claim 1, further comprising:
determining that the electronic device is proximate to a second induction coil that is included in the plurality of induction coils;
causing the electrical current supplied to the first induction coil to be terminated; and
causing electrical current to be supplied to the second induction coil to charge the electronic device.

8. The method of claim 1, further comprising, prior to determining that the electronic device is proximate to the first induction coil, determining that a user is holding the steering wheel.

9. The method of claim 8, further comprising:
after causing electrical current to be supplied by the first induction coil, determining that the user is no longer holding the steering wheel; and
in response, causing the electrical current supplied to the first induction coil to be terminated.

10. A system for charging an electronic device, comprising:
a steering wheel;
at least one induction coil disposed in the steering wheel; and
a processing unit coupled to the at least one induction coil and configured to:
transmit a sensing signal to a first induction coil included in the at least one induction coil to determine that the electronic device is proximate to the first induction coil; and
in response, cause electrical current to be supplied to the first induction coil to charge the electronic device.

11. The system of claim 10, wherein the at least one induction coil comprises a plurality of induction coils.

12. The system of claim 10, wherein determining that the electronic device is proximate to the first induction coil comprises determining that a wireless signal strength associated with the electronic device is above a threshold value.

13. The system of claim 10, wherein determining that the electronic device is proximate to the first induction coil comprises triangulating a location of the electronic device via three or more wireless sensors.

14. The system of claim 10, further comprising a wireless receiver in communication with the processing unit and configured to receive a charging specification from the electronic device, and wherein causing the electrical current to be supplied to the first induction coil comprises determining at least one characteristic of the electrical current based on the charging specification.

15. The system of claim 14, wherein the wireless receiver comprises a near-field communication (NFC) receiver.

16. The system of claim 10, further comprising at least one touch sensor electrode disposed in the steering wheel.

17. The system of claim 16, wherein the at least one touch sensor electrode is configured to detect at least one of a change in capacitance and a change in temperature.

18. The system of claim 16, wherein the processing unit is further configured to, prior to determining that the electronic device is proximate to the first induction coil, determine, via the at least one touch sensor electrode, that a user is holding the steering wheel.

19. A non-transitory computer-readable storage medium including instructions that, when executed by a processor, cause the processor to charge an electronic device, by performing the steps of:
transmitting a sensing signal to a first induction coil that is included in a plurality of induction coils that are disposed in a steering wheel to determine that the electronic device is proximate to the first induction coil;
receiving a charging specification from the electronic device; and
causing electrical current to be supplied to the first induction coil based on the charging specification to charge the electronic device.

20. The non-transitory computer-readable storage medium of claim 19, wherein the charging specification comprises a charging voltage and a charging current.

* * * * *